Patented Jan. 14, 1936

2,027,982

UNITED STATES PATENT OFFICE 2,027,982

PROCESS FOR REMOVING CATALYSIS INHIBITORS FROM AQUEOUS SOLUTIONS

Henry F. Johnstone, Urbana, Ill., assignor to Board of Trustees of the University of Illinois, Urbana, Ill., a corporation of Illinois No Drawing. Application August 18, 1933, Serial No. 685,747

7 Claims. (Cl. 204—9)

This invention relates to a process for removing catalysis inhibitors from aqueous solutions, and more particularly is directed to the removal of phenolic compounds and certain metallic salts which inhibit catalytic oxidation reactions in water or aqueous solutions.

In my copending application, Serial No. 500,684, filed December 8, 1930, I have described in detail a process for removing sulphur-dioxide from flue gases or other waste gases. In that process, the sulphur dioxide bearing gas is passed through a washing or scrubbing tower, where it is contacted by an aqueous washing solution and is absorbed into the solution, being then oxidized to sulphuric acid. The solution preferably contains manganese or iron sulphate, or both, which act as catalysts to increase the oxidation of the absorbed sulphur dioxide, in order to retain the solution at its maximum absorbing capacity. Preferably oxygen, or an oxygen-bearing gas, is also passed through the tower, to decrease the sulphur dioxide-oxygen ratio, whereby the reaction proceeds more rapidly. Simultaneous absorption of these two gases in the solution is followed by their interaction in the presence of a metallic ion catalyst. Such interaction removes the sulphur dioxide, as such, from the solution, increasing the capacity of the solution for absorbing this gas.

However, I have found that in practice, the process may be materially slowed down or inhibited by the presence of certain compounds which interfere with the operation of the catalyst. These compounds, commonly known as inhibitors or negative catalysts, are active even when present in extremely small concentrations. In the particular oxidation reaction outlined above, which has been taken by way of example only, as the process of the present invention is equally applicable to other than the oxidation of sulphur dioxide in water in the presence of a metallic ion catalyst, some of the inhibitors which prevent catalysis are the phenols, cresols, hydroquinone, and other members of the phenol group, including monohydric, polyhydric and substituted phenols. As a result of the incomplete combustion of coal, a number of these compounds may be present in the flue gases. Beside these organic inhibiting substances, there are several metallic salts that have been found to inhibit the catalytic oxidation of sulphur dioxide, especially when a manganese salt is used as the catalyst. For example, certain copper salts and stannous salts, which may be present in the scrubbing water as a result of circulation of the water through brass fittings or soldered connections, tend to destroy the effectiveness of the catalyst.

While the primary object of the present process is to remove these inhibitory compounds from such solutions because of their interference with catalytic oxidation, of which the oxidation of dissolved sulphur dioxide is only cited as one example, it is to be understood that the process is not limited to such solutions, but it may be used for the removal of phenolic compounds from any volume of water in which they may be present in small concentrations. This includes the treatment of factory wastes which contain phenolic compounds, and water supplies which are contaminated with such wastes, as well as all other types of solutions having such compounds therein.

In the preferred form of carrying out my invention, the process for preventing the inhibitory action of these compounds consists in destroying or removing the inhibitor by electrolysis under definitely controlled conditions.

These conditions are determined by the character and concentration of the inhibitors, the temperature of the aqueous washing solution or water solution, the type of catalyst which is being used, and the rate of flow of the solution through the electrolytic cell. Thus, in carrying out the invention, I preferably maintain a direct current between lead or other inert electrodes at an anodic current density which is determined by the concentration of the phenolic compounds or other inhibitors in the water and the rate at which the water or solution flows past the electrodes. The electrolytic oxidation which takes place at the anode either destroys the inhibitor entirely as in the case of the phenolic compounds, or renders it inactive as in the case of stannous salts, which are converted to stannic salts, where they are no longer inhibitory in action. In the case of copper salts, the inhibitory action is prevented by the deposition of the metal on the cathode, in which case a sufficient electromotive potential and cathodic current density is required to deposit the metal, which can be readily determined from the concentration of the salt in the solution.

In order to increase the effectiveness of the electrolytic action, I have found that the destruction of the phenolic compound may be accelerated by the aeration of the solution simultaneously with its electrolysis.

Also, the electrolysis must be governed to some extent by the type of catalyst which is being employed in the oxidation reaction. In the case of a manganese salt as a catalyst, it is necessary to prevent the removal of the catalyst itself, which occurs by the electrolytic deposition of the manganese dioxide upon the anode of the cell. I have found that this may be prevented by maintaining the solution at a temperature of at least 50 degrees centigrade during the electrolysis, which prevents the removal of the catalyst, while in no way affecting the destruction or removal of the inhibitory substances.

I have found that there is apparently no limit to the amount of the inhibitory substance which the current will remove provided that a sufficient current density is used at the time that the contamination occurs, and that a sufficient time is allowed, or the solution is sufficiently aerated in addition to the electrolysis, to provide for destruction or removal of the inhibitors. Under any of these conditions the inhibitors, either phenolic substances, or other oxidizable organic or inorganic substances, or copper salts, are completely removed from the catalytic solution, and the efficiency of the catalyst is retained in the solution.

In practice, such as in the use of the present invention in the removal of inhibitors from the washing solution used for absorbing sulphur dioxide from flue gases and the like, I preferably provide an electrolytic cell and aerator in the path of the washing solution leaving the washing tower. As the solution passes through the cell, it is simultaneously electrolyzed and aerated, the electrolytic action upon the solution which is circulating between the two electrodes of the cell destroying the inhibitors in the solution. The solution, as it leaves the washing tower, will have therein the inhibitors, whether they be phenolic compounds or other substances absorbed from the flue or waste gases, or whether they be metallic salts carried into the solution from various pipe fittings or connections. The temperature of the solution, if a manganese salt is used as a catalyst, must be maintained at a temperature of at least 50 degrees centrigrade to prevent the removal of the catalyst. The electrolytic cell is connected to a suitable source of direct current, which is capable of maintaining a sufficient current density on the anode, or cathode, to destroy the inhibitor in the solution effectively.

In carrying out the invention, I have found that a predetermined minimum current density is required to remove the inhibitor, this current density depending upon the character and concentration of the inhibitor. For example, the addition of one part per million of hydroquinone to a washing solution for absorbing sulphur dioxide from flue gases requires a current density of 0.15 amperes per square inch to destroy the inhibiting action thereof, if the current is flowing when the inhibitor is added or absorbed into the solution and is continued for at least twenty seconds thereafter. Hydroquinone is one of the most powerful inhibitors of the phenolic group. With this current density maintained, as much as three parts per million of hydroquinone may be added at intervals as short as forty-five seconds apart without causing inhibition of the catalytic reaction. If the rate of addition is greater, a longer period of electrolysis is required.

If the oxidation reaction in the solution has once become inhibited, a much longer time, in some instances twelve to twenty minutes, is required to remove the inhibitor and regain the original efficiency of the catalytic reaction. Also, I have found that when a solution has become inhibited, the catalytic activity can be regained quickly by shutting off the flow of gas or other substances being oxidized, and aerating the solution during the electrolysis.

It is apparent, therefore, that by providing an electrolyzing and aerating process such as described, catalytic inhibition of the oxidizing reaction can be prevented. A current density may be maintained in accordance with the character and concentration of the inhibitors which will normally be present, and, by allowing a sufficient time for each part of the solution to be electrolyzed, or by aerating the solution simultaneously with its electrolysis, the inhibitors, whether they be phenolic substances, or other oxidizable organic or inorganic substances, or copper salts, can be completely removed from the solution, and the catalyst, can be maintained at a high efficiency for aiding the oxidation reaction.

While I have described the application of my novel process for the removal of catalysis inhibitors in a scrubbing solution used to remove sulphur dioxide from flue gases and the like, it is to be understood that I do not intend to limit my invention to this specific use of the process, inasmuch as the invention is equally useful in other fields in which it is desired to remove phenolic compounds or other inhibitors from water or aqueous solutions. I therefore intend to be limited only in so far as defined by the scope and spirit of the appended claims.

I claim:

1. The method of removing phenolic compounds from aqueous solutions which comprises subjecting the solutions to direct current electrolysis, simultaneously aerating said solutions, controlling the anodic current density in accordance with the character of the phenolic compounds to completely remove said compounds by oxidation from said solution, and controlling the rate of flow of said solution in accordance with the concentration of said compounds.

2. The method of removing phenolic compounds from aqueous solutions of an oxidation catalyst which comprises subjecting the solutions to direct current electrolysis, and controlling the anodic current density and the rate of flow of said solutions in accordance with the character and concentration of the phenolic compounds to completely remove said compounds from said solution by oxidation and to prevent removal of said catalyst.

3. The method of removing phenolic compounds from aqueous solutions of an oxidation catalyst including manganese salts which comprises subjecting the solutions to direct current electrolysis, controlling the anodic current density and the rate of flow of said solutions in accordance with the character and concentration of the phenolic compounds to completely remove said compounds from said solution by oxidation, and controlling the temperature of said solutions to prevent the removal of said catalyst.

4. The method of removing phenolic compounds from aqueous solutions of an oxidation catalyst including manganese salts which comprises subjecting the solutions to direct current electrolysis, maintaining a minimum temperature of 50° centigrade in said solutions to prevent removal of said catalyst, and controlling the rate of flow of said solutions and the current density for said electrolysis in accordance with the concentration of said compounds to completely remove said compounds from said solution by oxidation.

5. The method of removing oxidizable organic catalysis inhibitors from flowing aqueous solutions having catalytic oxidation ions therein, which comprises subjecting said solutions to direct current electrolysis, and controlling the anodic current density during said electrolysis in accordance with the character and concentration of said inhibitors and the rate of flow of said solutions to completely remove said inhibitors from said solution by oxidation.

6. The method of removing phenolic catalysis inhibitors from sulphur-dioxide absorbing solutions having an oxidation catalyst therein for increasing the rate of absorption of said sulphur-dioxide, which comprises subjecting said solution to direct current electrolysis, controlling the current density during said electrolysis in accordance with the character and concentration of said inhibitors, and maintaining the temperature of said solutions at a predetermined minimum to prevent removal of said catalyst.

7. The method of removing inhibitors comprising any one of the following group, namely, phenols, cresols, and hydroquinone, from aqueous solutions having catalytic ions therein, which comprises subjecting said solutions to direct current electrolysis, and controlling the anodic current density in accordance with the character and concentration of said inhibitors to oxidize said inhibitors for effecting their complete removal from said solutions while maintaining said catalytic ions in said solutions.

HENRY F. JOHNSTONE.